United States Patent
Fries et al.

(10) Patent No.: US 10,333,363 B2
(45) Date of Patent: Jun. 25, 2019

(54) CONNECTION DEVICE AND ELECTRIC MACHINE

(71) Applicant: AUDI AG, Ingolstadt (DE)

(72) Inventors: Benedikt Fries, Geisenfeld (DE); Axel Löffler, Hohenwart (DE); Roland Crnogorac, Waiblingen (DE); Karl-Heinz Kopal, Landsberg am Lech (DE)

(73) Assignee: AUDI AG, Ingolstadt (DE)

( * ) Notice: Subject to any disclaimer, the term of this patent is extended or adjusted under 35 U.S.C. 154(b) by 224 days.

(21) Appl. No.: 15/328,347

(22) PCT Filed: Jul. 17, 2015

(86) PCT No.: PCT/EP2015/001478
§ 371 (c)(1),
(2) Date: Jan. 23, 2017

(87) PCT Pub. No.: WO2016/012088
PCT Pub. Date: Jan. 28, 2016

(65) Prior Publication Data
US 2017/0214284 A1    Jul. 27, 2017

(30) Foreign Application Priority Data
Jul. 24, 2014   (DE) .................. 10 2014 011 026

(51) Int. Cl.
*H02K 3/22*  (2006.01)
*H02K 3/24*  (2006.01)

(52) U.S. Cl.
CPC ............... *H02K 3/22* (2013.01); *H02K 3/24* (2013.01)

(58) Field of Classification Search
CPC .. H02K 3/22; H02K 3/24; H02K 3/50; H02K 9/00; H02K 9/005; H02K 9/19; H02K 9/193; H02K 5/22; H02K 5/225
USPC .......................................... 310/52, 54, 59, 71
See application file for complete search history.

(56) References Cited

U.S. PATENT DOCUMENTS

| 5,088,937 A * | 2/1992 | Gabany ............... H01R 24/50 |
|---|---|---|
| | | 439/581 |
| 5,489,810 A * | 2/1996 | Ferreira ................ F02N 11/04 |
| | | 310/214 |
| 2002/0079773 A1 | 6/2002 | Butman et al. |

(Continued)

FOREIGN PATENT DOCUMENTS

| CN | 1192603 A | 9/1998 |
|---|---|---|
| CN | 1416202 A | 5/2003 |

(Continued)

OTHER PUBLICATIONS

Machine Translation of SU442550, Sep. 1974 (Year: 1974).*

(Continued)

*Primary Examiner* — Quyen P Leung
*Assistant Examiner* — Eric Johnson
(74) *Attorney, Agent, or Firm* — Henry M. Felereisen LLC

(57) ABSTRACT

A connection device for connecting at least one electrical hollow conductor as used in a winding of an electric machine for a motor vehicle to an electrical energy source or an electrical energy storage or user is disclosed, wherein the connection device includes a first channel adapted for introduction of a coolant into the at least one hollow conductor.

12 Claims, 7 Drawing Sheets

(56) References Cited

U.S. PATENT DOCUMENTS

| | | | |
|---|---|---|---|
| 2013/0203288 A1* | 8/2013 | Hosler, Sr. | H01R 24/542 439/582 |
| 2014/0110091 A1 | 4/2014 | Fries et al. | |
| 2017/0126084 A1* | 5/2017 | Schweinert | H02K 3/22 |

FOREIGN PATENT DOCUMENTS

| | | | |
|---|---|---|---|
| CN | 101 183 808 | | 5/2008 |
| CN | 101183808 A | | 5/2008 |
| DE | 1 020 408 | | 12/1957 |
| DE | 1020408 B | | 12/1957 |
| DE | 1 942 160 | | 7/1966 |
| DE | 1942160 U | | 7/1966 |
| DE | 1 280 393 | | 10/1968 |
| DE | 1280393 B | | 10/1968 |
| DE | 1 282 159 | | 11/1968 |
| DE | 1942160 A1 | | 6/1970 |
| DE | 1282159 B | | 7/1979 |
| DE | 44 36 255 | | 4/1996 |
| DE | 4436255 A1 | | 4/1996 |
| JP | S54 95302 | | 7/1979 |
| JP | S 5495302 A | | 7/1979 |
| JP | S 5495302 A | | 6/2002 |
| SU | 442550 A1 * | | 9/1974 |
| WO | WO-2015150556 A1 * | 10/2015 | H02K 3/22 |

OTHER PUBLICATIONS

Hoewing, Machine Translation of DE1282159, Nov. 1968 (Year: 1968).*
English International Search Report issued by the European Patent Office in International Application PCT/EP2015/001478.
Chinese Search Report dated Jul. 4, 2018 with respect to counterpart Chinese patent application 201580041814.2.
Translation of Chinese Search Report dated Jul. 4, 2018 with respect to counterpart Chinese patent application 201580041814.2.

* cited by examiner

CONNECTION DEVICE AND ELECTRIC MACHINE

CROSS-REFERENCES TO RELATED APPLICATIONS

This application is the U.S. National Stage of International Application No. PCT/EP2015/001478, filed Jul. 17, 2015, which designated the United States and has been published as International Publication No. WO 2016/012088 and which claims the priority of German Patent Application, Serial No. 10 2014 011 026.5, filed Jul. 24, 2014, pursuant to 35 U.S.C. 119(a)-(d).

BACKGROUND OF THE INVENTION

The invention relates to a connection device with which at least one electric hollow conductor of an electric machine can be connected to an electrical energy source. The invention also relates to an electric machine with at least one such connection device.

In order to provide a particularly high power with an electric machine such as an electric motor, relative to its weight, it is sought to achieve a greatest possible current density in the electrically conducting material of windings of the electric motor. However such a high current density is associated with heat losses, which are dissipated with elaborate measures to prevent damage to the electric motor.

For the purpose of cooling for example cooling plates can be provided, which are impinged with cooling air. In addition other types of air cooling and also cooling with liquids are known from the state of the art. In electric motors known from the state of the art oftentimes heat is emitted via an electrical insulation from wires used in the windings of the electric motor. This is associated with a comparatively low efficiency because in most cases the electric insulation is also a good heat insulator.

It is also known from the state of the art to configure electrical conductors, which are arranged in grooves of a laminated core of the stator of an electric machine and form windings of the stator, as hollow conductors. Through these hollow conductors a coolant can be conducted in order to dissipate the heat loss. The use of electric hollow conductors through which a coolant can flow is for example known from power plant construction, for example when the electric machine is constructed as a turbo generator. However, the diameters of the hollow conductors used in this case are significant, i.e., in the range of more than 30 mm. However for non-stationary electric machines as they may for example be used in a motor vehicle, the use of coils made of hollow conductors through which a coolant can be conducted is relatively difficult. This is because the connected systems require a significant amount of mounting space and result in significant additional weight.

SUMMARY OF THE INVENTION

It is therefore an object of the present invention, to provide an improved connection device of the aforementioned type and an electric machine with such a connection device.

This object is solved by a connection device with the features of the corresponding independent patent claim and by an electric machine with the features of the corresponding independent patent claim. Advantageous embodiments with useful refinements of the invention are set froth in the dependent claims.

The connection device according to the invention serves for connecting at least one electrical hollow conductor, as for example used in a winding of an electric machine for a vehicle, to an electrical energy source or to an electrical energy storage or user. The connection device has a first channel via which a coolant can be introduced into the at least one hollow conductor. Such a connection device makes it possible to particularly efficiently dissipate heat that is generated during operation of the electric machine from the hollow conductors, which in the electric machine for the vehicle or a similar non-stationary device are assigned to at least one winding. This is accomplished in that via the connection device the electrical hollow conductors are impinged with the coolant, preferably a liquid coolant. As a result of the fact that the connection device serves for impinging the hollow conductors with electrical energy as well as with the coolant, a particularly compact, and space- and weight-efficiently configured, and thus improved, connection device is created.

By providing an electrically conducting connection device, which at the same time enables introduction of the coolant into the electrical hollow conductors, the number of system components required for the electrical connection and the cooling is particularly low. This leads to a particularly simple construction of the connection device as well as an electric machine with at least one such connection device.

The electrical hollow conductors through which the coolant flows can in particular be arranged in at least one groove of a laminated core of a stator of the electric machine. In this case the winding in which the at least one electrical hollow conductor is used is a winding of the stator or the stander of the electric machine.

Preferably the connection device has a second channel via which the coolant can be conducted out of the at least one hollow conductor. Such a configuration makes it possible to conduct the coolant in counter flow through two hollow conductors that are for example positioned in a groove of the laminated core. As a result of the fact that by means of such a connection device neighboring coolant can flow through hollow conductors in different, i.e., opposite, directions a particularly uniform temperature distribution in the hollow conductors that are assigned to at least one winding of the electric machine can be achieved.

If on the other hand the coolant would only flow in one direction through the hollow conductors that are for example situated in the groove of the stator, the coolant at the inlet side would still be relatively cold and would then be increasingly heated up when flowing through the hollow conductors. When the coolant would flow through all hollow conductors that are situated in the respective groove in one direction the inlet side of the stator would remain comparatively cold and the outlet side of the stator would heat up comparatively strongly. On the outlet side there would then be the risk of a burn through of at least the hollow conductor. This however can be prevented in the present case by introducing the coolant into the at least one hollow conductor via the first channel and conducting the coolant out of the at least one hollow conductor via the second channel.

In order to realize a flow through the hollow conductors according to the counter flow principle the individual hollow conductor can have a bend at the end of the stator that is opposite the connection device, at which bend the direction of flow of the coolant through the hollow conductor is inverted. However, also a second connection device with the first channel and the second channel can be provided at this axial end of the stator which is opposite the connection device, wherein the two channels of the second connection device are fluidly coupled with each other by a connection line, for example a tube section. This also allows impingement of neighboring, in particular adjoining, electrical hollow conductors with coolant that is conducted through the neighboring hollow conductors according to the counter flow principle.

Preferably the first channel and/or the second channel includes a collection region with which a plurality of coolant conduits formed in the connection device is fluidly coupled. Hereby a respective coolant conduit is assigned to a respective hollow conductor. Such a connection device, in which the channel at the collection region branches into a plurality of individual coolant conduits that are assigned to the respective hollow conductor, makes it possible to impinge a correspondingly large number of hollow conductors with the coolant or to discharge the coolant out of the hollow conductors.

This is in particular advantageous when the connection device is to be used in an electric machine, for example as a connection device for the windings in an electric motor of a vehicle. In this case a plurality of hollow conductors can then be used, which are constructed in the manner of capillary tubes with an outer diameter of preferably less than 1 mm. By providing the connection device the individual, delicate hollow conductors do not have to be arduously connected to a connection for the coolant. Rather the connection of the individual coolant conduits to the collection region of the channel is already ensured by the connection device itself. Thus only the hollow conductors have to be fluidly connected or coupled with the coolant conduit of the connection device respectively assigned to the hollow conductor in order to ensure impingement of the hollow conductors with the coolant or the discharge of the coolant from the hollow conductors.

The provision of a plurality of coolant conduits per channel thus makes it possible to impinge a corresponding plurality of hollow conductors with coolant or respectively to discharge the coolant from the hollow conductors. By using a plurality of hollow conductors for example in the groove of the laminated core of the stator of the electric machine the space available in the groove can be utilized particularly efficiently. This makes it possible to conduct particularly high currents through such a conductor packet formed by multiple electrical hollow conductors.

In current electric motors that have been developed with the goal of an optimal performance specific weight, the trend is toward a high-voltage supply. In the present case however due to the provision of a correspondingly large number of hollow conductors in a groove of the laminated core a high-current system instead of a high-voltage system can be implemented. The risks associated with a high-voltage system such as electric shock or voltage arcs can thus be avoided. Because the connection device enables a high current but low voltage configuration of the electric machine the corresponding low-voltage electric machine can be better controlled with regard to an electric shock. This also makes it possible to significantly reduce the risk of injury to a user of the electric machine.

It is further advantageous when the connection device includes a connection region in which the coolant conduits end. Hereby the ends of the coolant conduits provide receptacles into which the hollow conductors can be inserted. Such a connection region enables a particularly reliable connection or installation of the hollow conductors to the respectively assigned coolant conduits. Errors that may easily occur for example during the manual connection of the hollow conductors can be avoided particularly efficiently.

The connection region also enables to verify the correct connection of the hollow conductors to the coolant conduits of the connection device. This in particular applies when the connection region has an even surface. The respective hollow conductors only have to be inserted into the receptacles present in this even surface which are formed by the ends of the coolant conduits, and then for example coupled with the respective coolant conduits by soldering, welding or similar materially bonding connection technology.

The simple insertion of the hollow conductors into the receptacles that are present in the connection region the hydraulic and also electrical connection of the hollow conductors can be achieved particularly easily and reliably. In particular errors such as electrical short circuits can be very easily avoided, which could otherwise lead to further damage during operation of the electric machine.

In the connection region the receptacles are preferably arranged in correspondence to the arrangement of the ends of the hollow conductors, which arrangement results from the winding diagram for example of the stator of the electric machine. Then the insertion of the hollow conductors into the receptacles provided by the ends of the coolant conduits can be realized particularly easily.

It is further advantageous when in the connection region first coolant conduits which are fluidly coupled with the collection region of the first channel are arranged alternatingly in at least one direction of extent of the connection region with second coolant conduits, wherein the second coolant conduits are fluidly coupled with the collection region of the second channel. This alternating sequence of the coolant conduits in the connection region enables a particularly well an alternating flow through the hollow conductors respectively in counter flow to the neighboring hollow conductor. This leads to a particularly good heat dissipation from the electric machine during its operation and to a particularly homogenous temperature distribution.

It is further advantageous when a flow cross section of the collection region increases towards an interface region of the connection device. Hereby the interface region is configured for connection of the connection device with an inlet line or with an outlet line for the coolant. Such a configuration of the flow cross section of the collection region, which increases toward the inlet line or the outlet line, leads to a particularly low loss flow of the coolant through the connection device.

It is also advantageous for a low loss flow path when the coolant conduits have at least one curvature region. The avoidance of sharp bends in the coolant conduits or at their transition to the collection region allows ensuring a particularly even, in particular laminar, flow of the coolant through the coolant conduits.

It has further proven advantageous when the flow cross section of the collection region at least substantially corresponds to the sum of the flow cross sections of the coolant conduits of the channel, which are fluidly coupled with the collection region of the channel at a respective distance to the interface region. In other words with increasing distance of a site of the collection region to the interface region the flow cross section of the collection region decreases, but also the number of the coolant conduits that are still fluidly coupled with the collection region deceases proportionally. Vice versa with increasing proximity to the interface region the flow cross section of the collection region and also the total number of coolant conduits that are fluidly coupled with the collection region increases. This leads to a particularly even impingement of the individual coolant conduits with the coolant during operation of the electric machine. Likewise the coolant can be discharged from the hollow conductors in a particularly flow effective manner.

The respective interface region can have a threading in order to simplify a coupling or fluidic connection of the connection device with the outlet line or with the inlet line for the coolant.

Furthermore a contact surface is preferably formed in the interface region via which the at least one hollow conductor of the electric machine can be impinged with electrical energy or electrical energy can be conducted away from the electric machine. By providing such a contact surface the electrical connection of the hollow conductors can be accomplished in a particularly simple manner. In particular this can be accomplished in that the electrical conductor is placed on the contact surface and then by screwing the inlet line and/or outlet line with the respective threading formed in the interface region the electrical conductor is pressed against the contact surface.

In particular when multiple hollow conductors are provided in the at least one winding of the electric machine it has proven advantageous when the connection device is produced by 3D-printing. In addition or as an alternative a three dimensional sintering, in particular laser sintering, can be used. Such production methods make it possible to generate structures, which are compacted on a very narrow space. Thus in particular multiple coolant conduits and the shape of the collection regions of the channels can be formed particularly accurately and reliably.

In addition or as an alternative the connection device can be produced in that individually processed corresponding through openings having discs are joined, for exampled glued together also a casting method and/or a material removing method the connection device can be produced. However with regard to the desired flow-efficient design of the channel in particular when the channel includes the collection region and the coolant conduits, material removing methods such as milling or drilling are less advantageous than the previous methods that involve a three dimensional layered construction, such as the 3D-printing or 3D laser processing.

The electrical contacting of the hollow conductors can be ensured particularly easily when the connection device is made of metal. However, the connection device can also be a hybrid part in which the connection device can include regions that are made of a plastic and regions that are made of metal. It is also possible to form a base body of plastic and to provide this plastic with a metal for example by coating a surface of the connection device with the metal. Thus a configuration can be ensured, which enables the electrical connection of the hollow conductors in a simple and cost effective manner.

The electric machine according to the invention includes at least one connection device according to the invention and can in particular be configured as an electric machine for a vehicle. For example the electric machine can be configured to provide propulsion energy for driving the vehicle. In addition or as an alternative the electric machine can be configured as a generator, which during driving operation of the vehicle converts mechanical energy into electrical energy.

The advantages and preferred embodiments described for the connection device according to the invention also apply to the electric machine and vice versa.

The features and feature combinations mentioned above in the description and the features and feature combinations individually mentioned in the figure description and/or shown in the figures may not only be used in the respectively mentioned combination but also in other combinations or by themselves without departing form the scope of the invention. The invention thus also includes embodiments which are not explicitly shown or explained in the Figures but which emerge from the description and can be produced by separate feature combination.

BRIEF DESCRIPTION OF THE DRAWING

Further advantages features and details of the invention will become more apparent form the claims the following description of preferred embodiments and by way of the drawings. Hereby it is shown in:

DETAILED DESCRIPTION OF PREFERRED EMBODIMENTS

Figure 1:
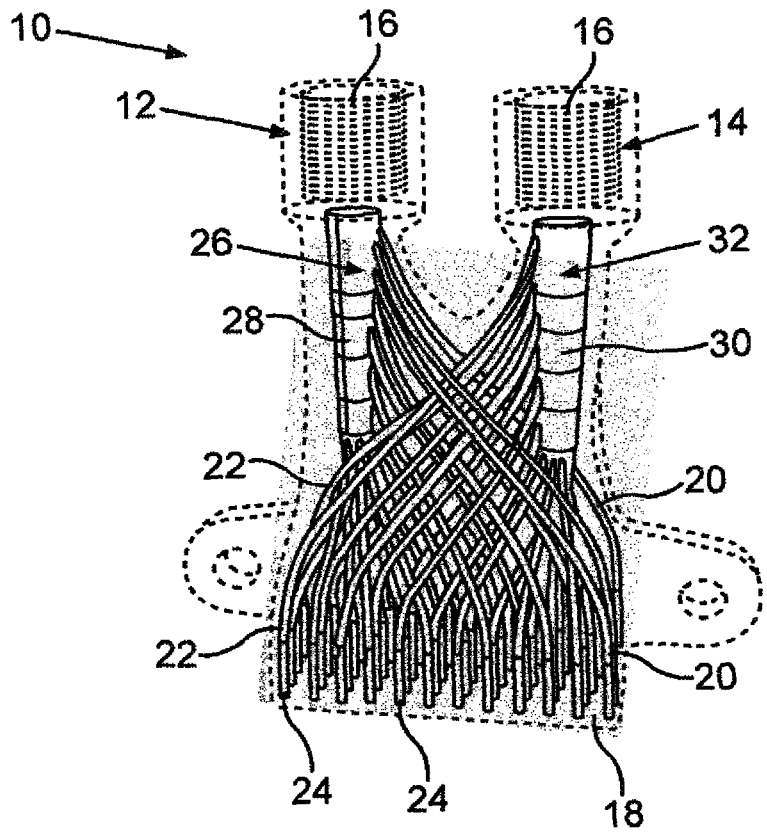
FIG. 1 a perspective and partially transparent view of a connection device by means of which the electric hollow conductor can be electrically connected to a winding of the stator of an electric motor and can be impinged with a coolant.

With a connection device 10, which is shown in a perspective and partially transparent view in FIG. 1, electrical hollow conductors of a winding of an electric machine can be contacted and also be impinged with coolant. In an electric machine such as an electric motor or a generator such hollow conductors can in particular be arranged in grooves of a laminated core, which belongs to a stator of the electric machine. The electrical connection of the electrical hollow conductors arranged in the grooves results from the winding diagram of the electric machine.

The electric motor, whose hollow conductors form the windings and through which the coolant can flow, can for example be configured as an electric drive motor for a vehicle, such as a motor vehicle. In order to be able to dissipate the heat released by the hollow conductors of such a high-power density electric motor during operation of the electric motor particularly efficiently, the hollow conductors are impinged with a coolant, for example a liquid coolant.

The supply of the hollow conductors with the coolant, the discharge of the heated coolant from the hollow conductors and the impingement of the electrical hollow conductors with electrical energy is accomplished by the connection device 10 shown in FIG. 1. The connection device 10, which is designed in the manner of a plug, thus enables a fast and simple connection of the hollow conductors that protrude from the winding overhang of the electric motor to an electrical energy source as well as to a coolant circuit. During operation of the electric machine as generator the connection to a coolant circuit and the electrical connection with the energy storage and/or with an electrical user can be accomplished analogously.

At its upper end shown in FIG. 1 the connection device 10 has two interface regions 12, 14 via which the connection to the coolant circuit is realized. The first interface region 12 serves for example for connection of a supply line form the coolant. The second interface region 14 serves on the other hand for connection of an outlet line via which heated coolant is discharged. In the present case the interface regions 12, 14 have screw threads 16 for example in the form of the inner threading shown in FIG. 1, via which the inlet line or the outlet line for the coolant can be easily and quickly connected.

On a side, which is opposite the interface regions 12, 14, the connection device 10 has a connection region 18. In this connection region ends of coolant conduits 20, 22 formed in the connection device 10 form respective receptacles 24 for the ends of the (not shown) electrical hollow conductors. The electrical conductors can be inserted into the receptacles and soldered.

First coolant conduits 20 belong to the first channel 26 of the connection device 10, which channel leads from the first interface region 12 to the connection region 18. The first channel 26 includes a collection region 28 and the first coolant conduits 20, which lead to the connection region 18. Analogously second coolant conduits 22 are fluidly connected with a collection region 30 of a second channel 32 of the connection device 10, which leads from the connection region 18 to the second interface region 14 for discharge o the coolant.

In the present case the connection region 18 has an even surface (see FIG. 3 and FIG. 10) on which the coolant conduits 20, 22 end and form the receptacles 24 for the hollow conductors. The arrangement of the receptacles 24 provided in the connection region 18 hereby corresponds exactly to the arrangement of the hollow conductor ends of the stator, which results from the winding diagram of the hollow conductors. In the present case the connection region 18 is substantially configured as a rectangular surface and the receptacles 24 are arranged in evenly spaced-apart rows and columns (see FIG. 10). The shown spatial arrangement of the receptacles 24 is however only exemplary and is adjusted to the respective arrangement of the hollow conductor ends.

As a result of the arrangement of the receptacles 24 in the connection region 18, which corresponds with the winding diagram of the hollow conductors, each individual hollow conductor can be very easily connected with the inlet line or the outlet line for the coolant without each individual hollow conductor having to be exactly guided to the inlet line or the connection line. A complicated gluing, casting stiffening, screwing or soldering of each individual hollow conductor which has to be connected to the inlet line or the outlet line is thus not required.

Rather the hollow conductor ends only have to be inserted into the receptacles 24 and fastened and fastened for example by soldering. This is in particular advantageous because the individual hollow conductors have an outer diameter of less than 1 mm and thus it would be difficult to reliably achieve an exact installation of such hollow conductors without using the connection device 10.

A section of the connection device 10, which is arranged between the interfaces 12, 14 and the connection region 18, serves for distributing the coolant to the respective receptacles 24 and thus to the hollow conductors assigned to these receptacles 24. In this distribution section the first coolant conduits 20 branch off from the collection region 28 of the first channel 26, wherein the end openings of the first coolant conduits 20 form the receptacles for the hollow conductor ends in the connection region 18.

Analogously the second coolant conduits 22 though which the coolant after having been heated after flowing through the hollow conductors is discharged extends from the connection region 18 toward the collection region 30 of the second channel 32 wherein the second coolant conduits 22 lead into the second collection region 30.

In the present case the formation of the coolant conduits 20, 22 in the connection device 10 ensures that the coolant flows through the respectively neighboring hollow conductors arranged in the groove of the stator in counter flow. Correspondingly the receptacles 24 of the first coolant conduits 20 are arranged alternatingly with the receptacles 24 of the second coolant conduits 222 in the direction of extent of the connection region 18, which coincide with a width B and a depth T of the connection region 18 (see FIG. 10). Thus the receptacle 24 of a second coolant conduit 22 follows in the connection region 18 in the respective direction of extent, i.e., in the direction of the width B and also in the direction of the depth T to the connection 24 of a first coolant line 20.

The alternating flow through the hollow conductors is ensured by the arrangement of the coolant conduits 20, 22 in the connection device 10, without the ends of the hollow conductors having to be individually connected to the inlet line or the outlet line for the coolant. Rather the connection device 10 only has the first interface region 12, which serves as connection for the cold coolant, and the second interface region 14, which serves as connection for the outlet line via which the heated coolant is discharged. The alternating flow through the hollow conductors, which is advantageous regarding temperature housekeeping of the hollow conductors and thus the electric machine, is thus provided by the geometry in the three dimensional component, which is the connection device 10.

FIG. 1 shows further that the coolant conduits 20, 22 close to the connection region 18 substantially extend straight but on their way to the collection regions 28, 30 have curvature regions, which ensure a flow efficient design of the coolant conduits 20, 22. Moreover the flow cross section of the collection regions 28, 30 widens from its end proximate to the connection region 18 to the interfaces 12, 14. This also facilitates a low loss flow through the channels 26, 32. The flow cross section of the collection region 30 is hereby increases toward the second interface 14 the more of the second coolant conduits 22 lead into the collection region 30. Analogously a flow cross section of the collection region 28 decreases from the first interface region 12 toward the connection region 28 the more first coolant conduits 20 branch off from the collection region 28.

The collection regions 28, 30 provide at the same time a hollow space or reservoir for the coolant, which is supplied via the inlet line to the corresponding hollow conductors or is discharged via the outlet line from the corresponding hollow conductors.

Figure 2:
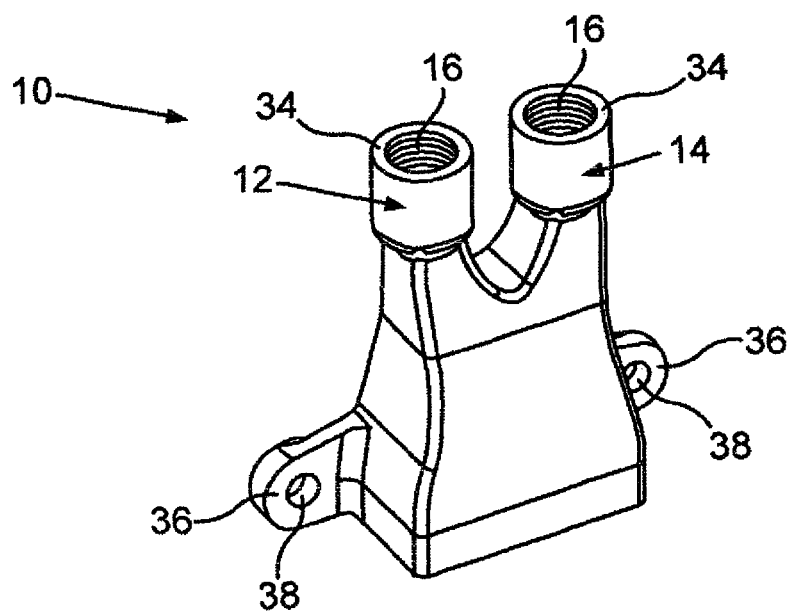
FIG. 2 the connection device according to FIG. 1 in a perspective view.

As particularly well shown in FIG. 2 the interface regions 12, 14 are configured even at their topside 34 shown in FIG. 2. On these topsides 34 an electrical conductor, for example in the form of a connection plate in the manner of a cable lug or the like, can be placed. The connection plate can be brought into a tight flat contact with the connection device 10 by being screwing the inlet line and the outlet line for the coolant into the screw threads 16.

As can be further seen from FIG. 2 fastening eyes 36 with bores 38 for threaded bolts can be provided on sides of the connection device 10.

Figure 3:
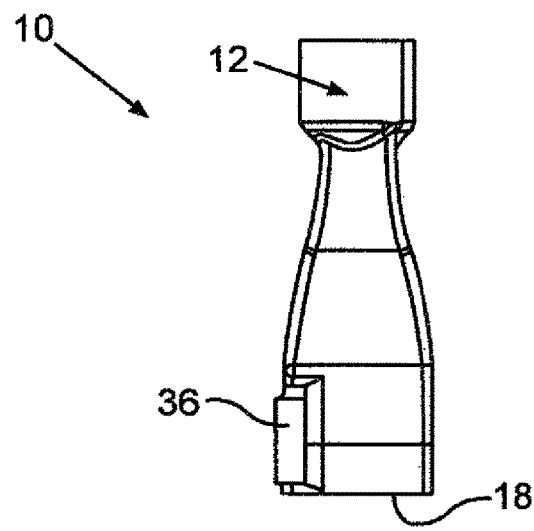
FIG. 3 the connection device according to FIG. 1 in a side view.

The side view of FIG. 3 illustrates particularly well the shape of the connection device 10 in the distribution section for the coolant, which narrows toward the interface regions 12, 14 in the manner of a bottleneck.

Figure 4:
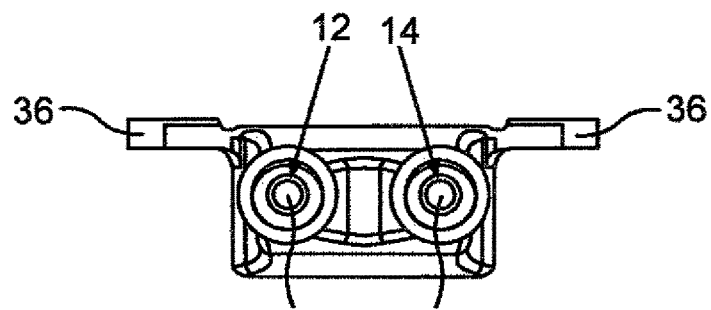
FIG. 4 the connection device according to FIG. 1 in a top view onto connections for a coolant inlet line and a coolant outlet line.

FIG. 4 shows the shape of the collection regions 28, 30, which has a round cross section close to the interface regions 12, 14.

Figure 5:
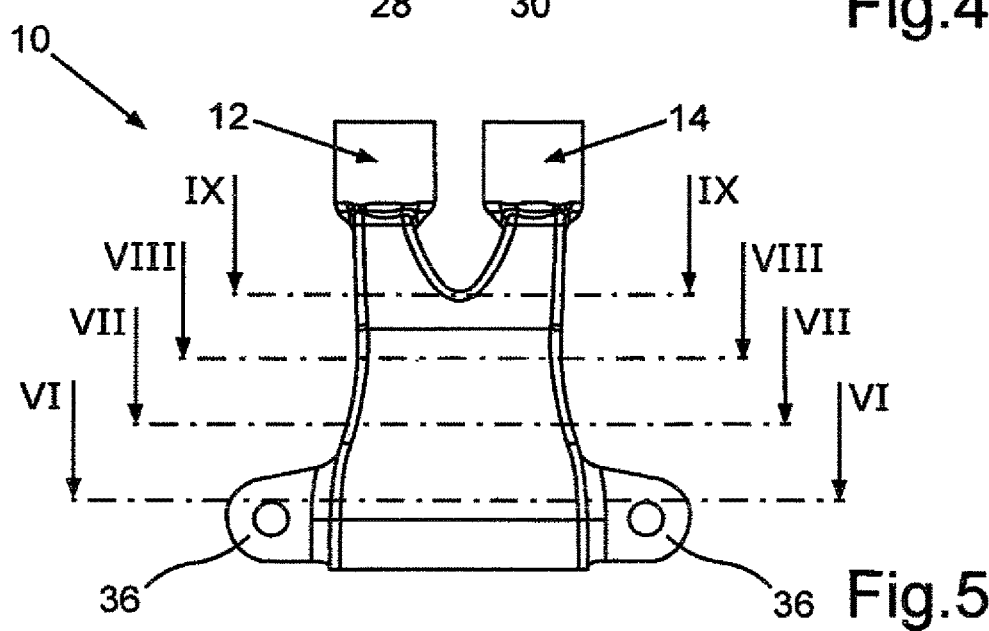
FIG. 5 a further side view of the connection device according to FIG. 1 in which sectional planes of sectional views are shown according to FIGS. 6 to 9.

FIG. 5 shows sectional planes of the connection device 10, which correspond to the sectional views shown in FIG. 6 to FIG. 9.

Figure 6:
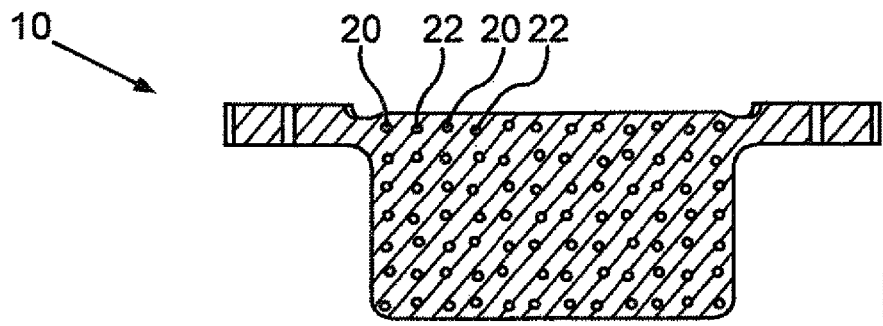
FIG. 6 a sectional taken along line VI-VI of FIG. 5.
Figure 10:
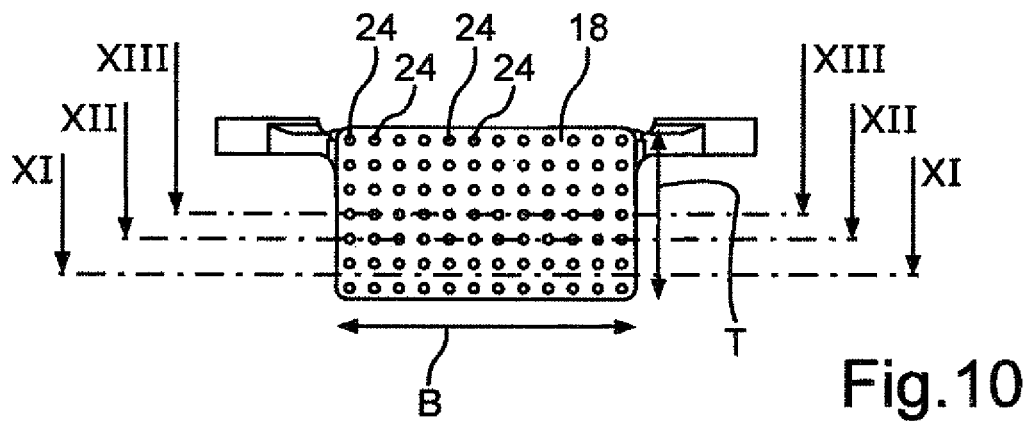
FIG. 10 a view onto a bottom side of the connection device according to FIG. 1 which illustrates the spatial arrangement of the receptacles onto which the ends of the hollow conductors are inserted.

Thus from the sectional view of FIG. 6 it can be seen that starting from the regular arrangement of the receptacles 24 in rows and columns according to FIG. 10, which is present in the connection region 18 of the connection device 19, an already less regular arrangement of the cross section of the coolant conduits 20, 22 is present at a small distance to the connection region 18 due to the curvature of the coolant conduits 20, 22.

Figure 7:
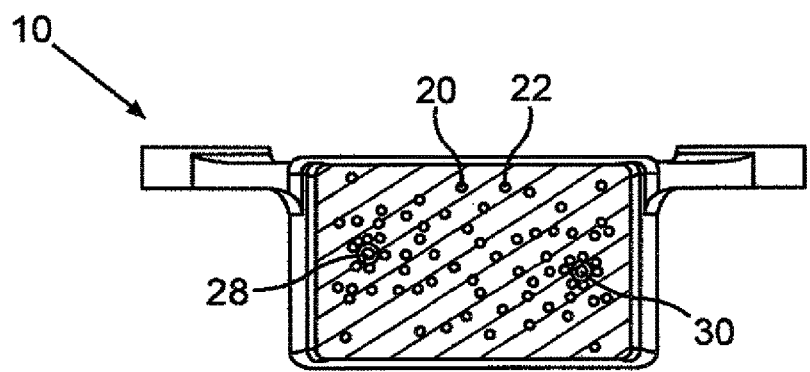
FIG. 7 a sectional taken along line VII-VII of FIG. 5.

The sectional view of FIG. 7 shows how the coolant conduits 20, 22 migrate further towards the collection regions 28, 30 with increasing distance to the connection region 18.

Figure 8:
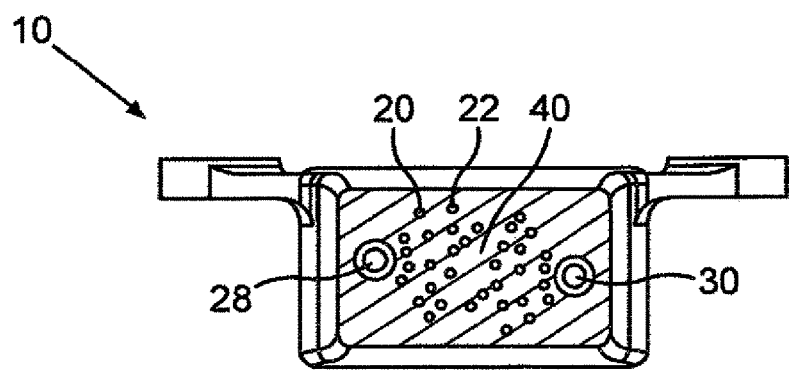
FIG. 8 a sectional taken along line VIII-VIII of FIG. 5
Figure 9:
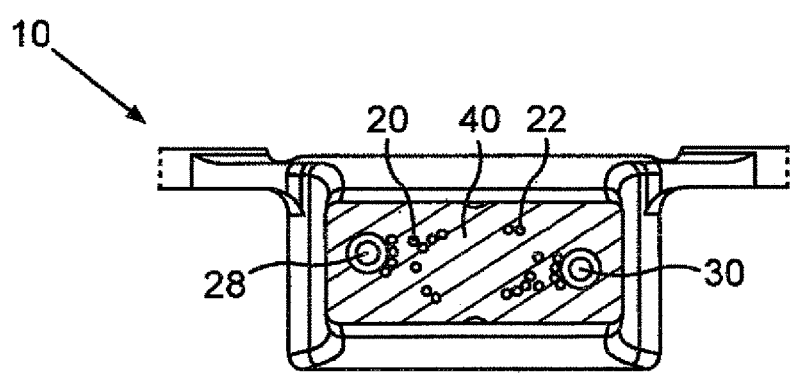
FIG. 9 a sectional taken along line IX-IX of FIG. 5.

Corresponding to the sectional view of FIG. 8 at this height of the connection device 10 there is still a greater number of coolant conduits 20, 22 only in a region 40 between the collection regions 28, 30. A number of the coolant conduits 20, 22 per square area further decreases in this region 40 toward the interface regions 12, 14, while a flow cross section of the collection regions 28, 30 increases (see FIG. 9).

FIG. 10 shows how in the connection region 18 the receptacles 24 of the respective coolant conduits 20, 22 can be arranged uniformly spaced apart form each other in the directions of extent of the connection region 18 which coincide with the width B and the depth T.

Figure 11:
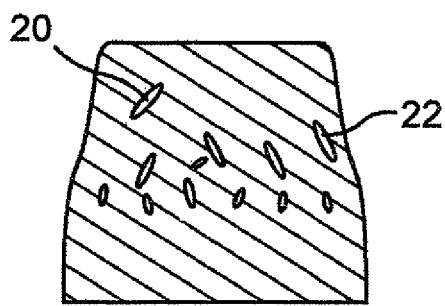
FIG. 11 a sectional taken along line XI-XI of FIG. 10.

The sectional view of FIG. 11 shows particularly well that in the distribution section at a relatively great distance in the direction of the depth T of the fastening eyes 36 the coolant conduits 20, 22 are present but not the collection regions 28, 30 of the channels 26, 32.

Figure 12:
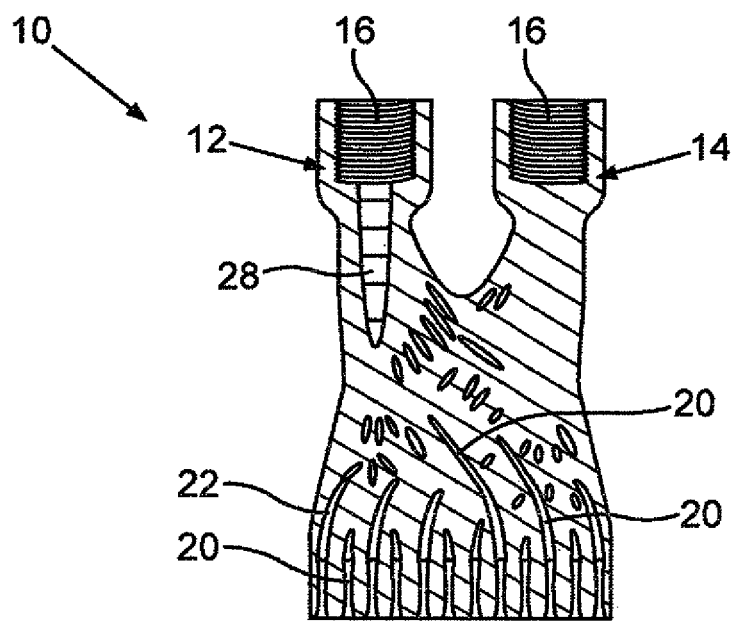
FIG. 12 a sectional taken along line of FIG. 10.

The sectional view of FIG. 12 further shows that the collection regions 28, 30 are arranged offset to each other in the connection device 10 in the direction of the depth T. In addition FIG. 12 shows the curvature of the first coolant conduits 20 extending from collection region 28.

Figure 13:
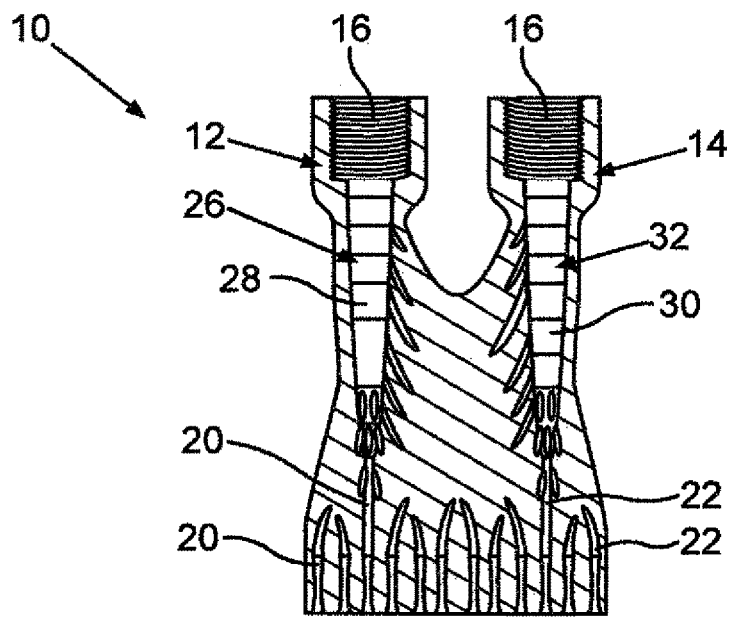
FIG. 13 a sectional taken along line XIII-XIII of FIG. 10.

The sectional view of FIG. 13 shows the shape of the collection regions 28, 30 particularly well, which narrows in cross section toward the connection region 18. In addition FIG. 13 shows that the connection device 10 is configured solid and one-piece with the exception of the hollow regions that are formed by the coolant conduits 20, 22 and the collection regions 28, 30 as well as the regions of the screw threads 16. This can for example be achieved by a three-dimensional layered production of the connection device 10 for example by 3D-printing or 3D sintering.

Figure 14:
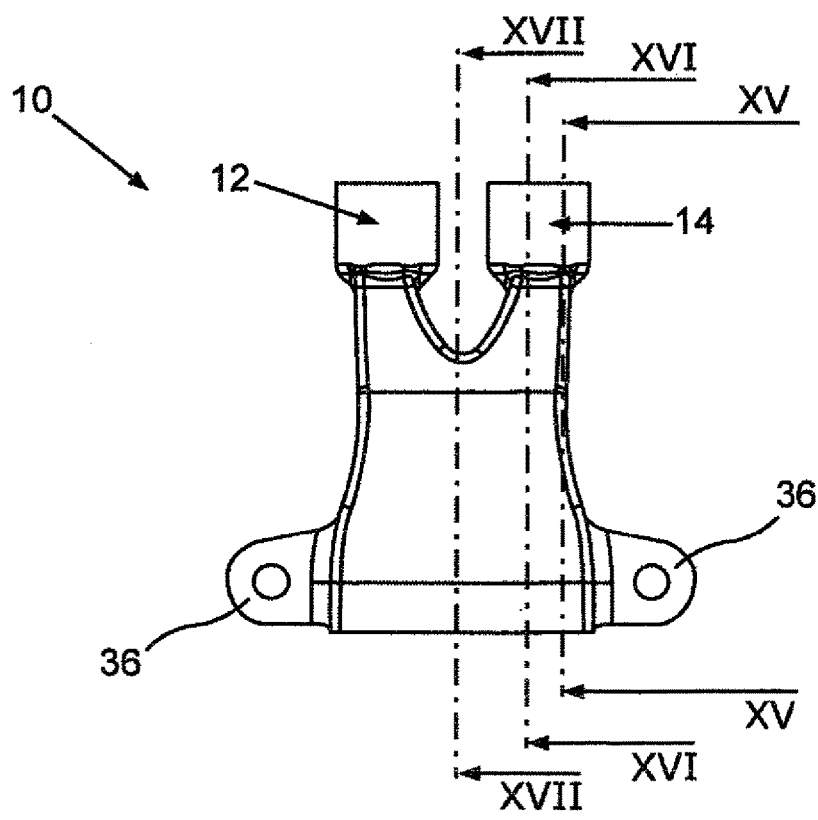
FIG. 14 a further sectional view of the connection device according to FIG. 1 wherein sectional planes of further sectional vies according to FIGS. 15 to 17 are shown.
Figure 15:
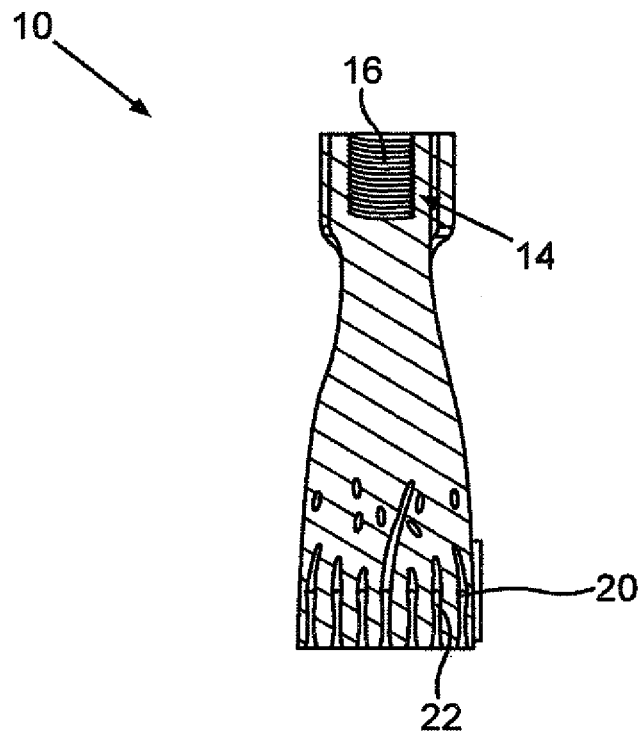
FIG. 15 a sectional taken along line XV-XV of FIG. 14.
Figure 16:
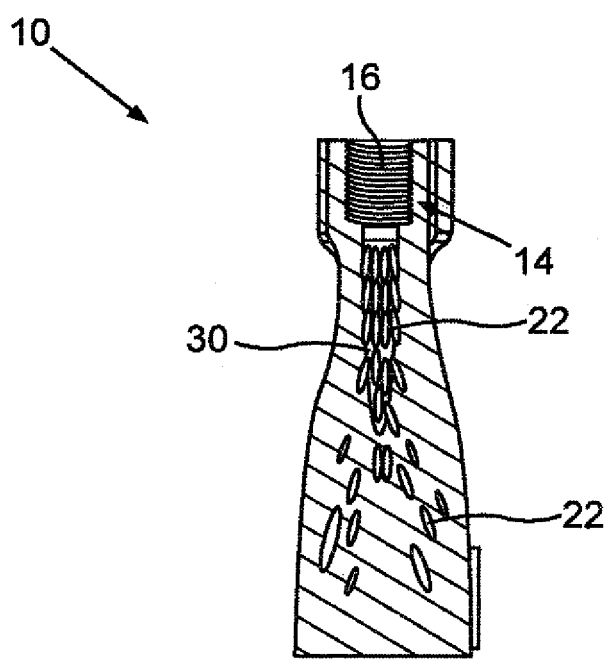
FIG. 16 a sectional taken along line XVI-XVI of FIG. 14.
Figure 17:
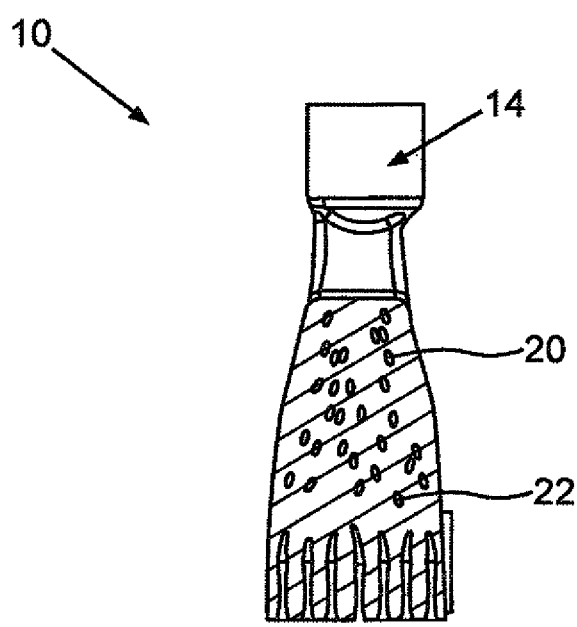
FIG. 17 a sectional taken along line XVII-XVII of FIG. 14.

FIG. 14 illustrates the position of the sections through the connection device 10 shown in FIG. 15 to FIG. 17.

Thus FIG. 15 shows the comparatively straight extent of the coolant conduits 20, 22 close to the connection region 18 particularly well.

FIG. 16 shows the density of the coolant conduits 2 close to the collection region 30, which increases with increasing distance to the connection region 18, into which collection region the coolant conduits 22 lead.

FIG. 17 shows the different course of the coolant conduits 20, 22 close to the connection region 18 due to the curved shape of the coolant conduits and a section of the connection device 10, which is arranged between the collection regions 28, 30.

By using the connection device 10 the delicate hollow conductors, which during connection require very good motor skills, can be electrically connected and coupled particularly easily to a coolant circuit for example in a serial production. In particular a machine-controlled connection of the individual hollow conductors with the ends of the coolant conduits 20, 22 which form the receptacles 24 can be realized, which compared to a manual method is associated with far less errors.

Also low-number-wire or single-wire hollow conductor packs can be used in the grooves of the laminated core of a stator of the electric machine, which makes it possible to use high-ohm electric machines instead of high-voltage electric machines. Thus for example a hollow conductor pack in the manner of a stranded wire, which forms such a wire can be used and its individual hollow conductors can fill the square or trapezoidal space available in the in the groove for availability usually in cross section rectangular or trapezoid shaped space particularly good.

The invention claimed is:

1. A connection device for connecting at least one electrical hollow conductor as used in a winding of an electric machine for a motor vehicle, to an electrical energy source or an electrical energy storage or an electrical energy user, said connection device comprising a first channel, adapted for introduction of a coolant into the at least one hollow conductor, a second channel via which the coolant can be discharged from the at least one hollow conductor, wherein the first channel and/or the second channel include a collection region having a flow cross section in which a plurality of coolant conduits formed in the connection device are fluidly coupled, said coolant conduits being assigned to the hollow conductors in one to one correspondence, wherein the flow cross section of the collection region increases toward an interface region of the connection device, said interface region being configured for connection of the connection device with an inlet line or with an outlet line for the coolant.

2. The connection device of claim 1, further comprising a connection region having a surface, and coolant conduits ending in the connection region, wherein ends of the coolant conduits provide receptacles for insertion of the hollow conductors.

3. The connection device of claim 2, wherein the surface of the connection region is even.

4. The connection device of claim 2, wherein first ones of the coolant conduits are fluidly connected with the collection region of the first channel and second ones of the coolant conduits are fluidly coupled with the collection region of the second channel, and wherein in the connection region the first ones and second ones of the coolant conduits are arranged alternating with each other in at least one direction of extent of the connection region.

5. The connection device of claim 1, wherein the flow cross section of the collection region substantially corresponds to at least a sum of flow cross sections of respective ones of the plurality of the coolant conduits which are fluidly coupled with the collection region at a respective distance to the interface region.

6. The connection device of claim 5, wherein the respective ones of the plurality of the coolant conduits have at least one curvature.

7. The connection device of claim 1, wherein the interface region has a contact surface for an electrical conductor via which the at least one hollow conductor can be impinged with electrical energy or electrical energy can be conducted from the electrical machine.

8. The connection device of claim 1, wherein the interface region has a screw thread.

9. The connection device of claim 1, wherein the connection device, is produced by at least one process selected from the group consisting of three dimensional printing, three dimensional sintering joining of individually processed discs, casting and material removing processes.

10. The connection device of claim 9, wherein the connection device is made of a metal and/or of a plastic provided with a metal.

11. An electric machine, comprising a connection device, for connecting at least one electrical hollow conductor as used in a winding of an electric machine for a motor vehicle, to an electrical energy source or an electrical energy storage or an electrical energy user, said connection device comprising a first channel adapted for introduction of a coolant into the at least one hollow conductor, a second channel via which the coolant can be discharged from the at least one hollow conductor, wherein the first channel and/or the second channel include a collection region having a flow cross section in which a plurality of coolant conduits formed in the connection device are fluidly coupled, said coolant conduits being assigned to the hollow conductors in one to one correspondence, wherein the flow cross section of the collection region increases toward an interface region of the connection device, said interface region being configured for connection of the connection device with an inlet line or with an outlet line for the coolant.

12. The electric machine of claim 11, configured to provide propulsion energy for propulsion of the vehicle and/or to convert during driving of the vehicle mechanical energy into electrical energy.

* * * * *